T. KELLER.

CHANGEABLE SIGN.

APPLICATION FILED JULY 3, 1922.

Reissued Sept. 12, 1922. 15,454.

2 SHEETS—SHEET 1.

Inventor
Theodore Keller
By
Wolfe & Moore
Attys.

T. KELLER.

CHANGEABLE SIGN.

APPLICATION FILED JULY 3, 1922.

Reissued Sept. 12, 1922.

15,454.

2 SHEETS—SHEET 2.

Inventor
Theodore Keller.

By

Wolfe & Moses
Attys.

Reissued Sept. 12, 1922. Re. 15,454

UNITED STATES PATENT OFFICE.

THEODORE KELLER, OF NEW YORK, N. Y., ASSIGNOR OF ONE-HALF TO MAX MICHEL, OF NEW YORK, N. Y.

CHANGEABLE SIGN.

Original No. 1,411,439, dated April 4, 1922, Serial No. 489,776, filed August 4, 1921. Application for reissue filed July 3, 1922. Serial No. 572,746.

*To all whom it may concern:*

Be it known that I, THEODORE KELLER, a citizen of the United States, residing at New York city, in the county of New York and State of New York, have invented certain new and useful Improvements in Changeable Signs, of which the following is a specification.

My invention relates to signs particularly useful for advertising purposes, of such a nature that on viewing the sign from the front thereof a certain representation is visible when the sign is illuminated from the front only, and this representation, together with an additional one, is visible when the sign is illuminated from the rear thereof.

The representation visible when the illumination is from the front only, hereinafter called the front representation, may bear different relation to the additional representation, hereinafter called the rear representation, and also to the combination of these two representations, hereinafter called the complete representation. For example, the rear representation may appear as a mere addition to the front representation in the complete representation; or in the complete representation the front and rear representations may be merged, at least in part, one in the other. Furthermore, there may be an omission in either the front or rear representations, generally and preferably in the rear one, to correspond with the front representation, or at least a part thereof; or there may be no such omission.

Referring to the drawings.

Figure 2:
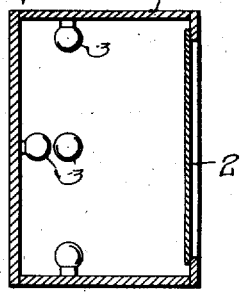
Figure 2 is a vertical cross sectional view thereof.
Figure 1:
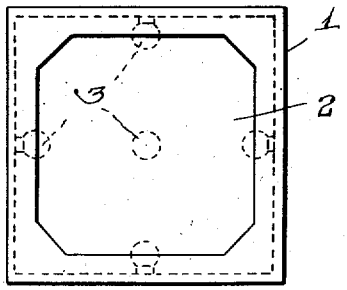
Figure 1 is a front plan view of my sign.

Referring to Figures 1 and 2, 1 designates a suitable box or framework having an open front 2 within which my advertising cards are positioned. The box may be closed except for this opening, and suitably located within the box are illuminating devices, such as electric lamps 3 which may be alternately flashed on and off by means of any suitable flasher, which is not shown, as it forms no part of the invention. The box 1 may be so constructed that the advertising cards may be easily replaceable within the opening 2.

Figure 4:
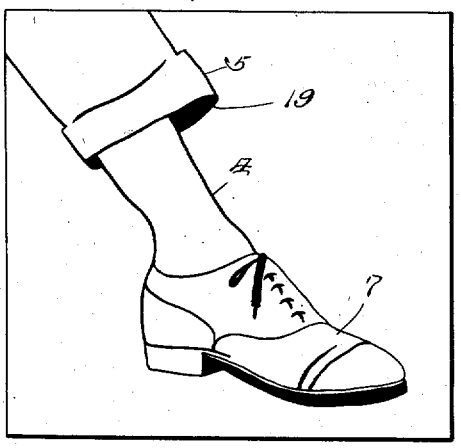
Figures 3, 4 and 5 show the pictures used in advertising a shoe, Figure 3 showing the picture appearing on the front of the screen, Figure 4 showing the picture appearing on the rear of the screen, and Figure 5 showing the combination of the two.
Figure 3:
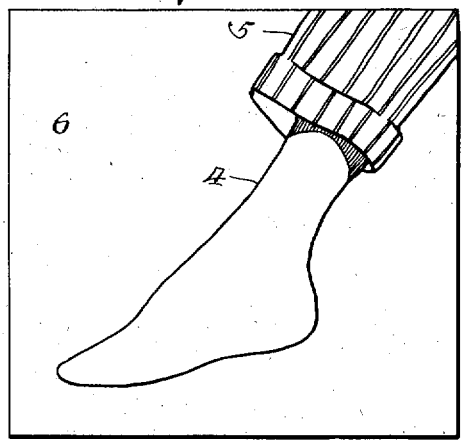
Figure 5:
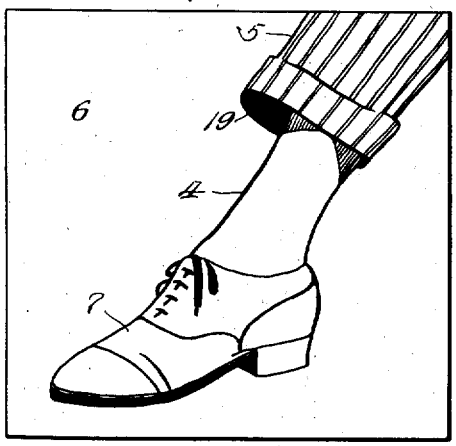

Referring to Figures 3, 4 and 5, the front picture shows a sock 4 and trousers 5, both of which may be colored as desired, and a white background 6. The rear picture shows the sock 4, which may be colored either the same as that on the front of the picture, or differently should it be desired to produce a change in color as the lights are flashed, or the sock on the rear picture may be merely an outline without any coloring, and the same is true of the representation of the trousers on the rear picture. A shoe 7 appears as worn over the sock on the rear picture and this is generally so colored, that it is generally darker than the color of the sock, the color of the shoe being such that on flashing the light to make the combination of the front and back picture visible, the part of the sock within the shoe will become merged therein and substantially apparently invisible.

It is, of course, obvious that the positions of the front and rear pictures may be interchanged when so desired; that is, the picture illustrated in Fig. 3 may be located at the rear and that illustrated in Fig. 4 may be located at the front.

The rear picture is located immediately behind the front picture in such a manner, that on flashing the lights, the two pictures will blend into one and appear as shown on Figure 5.

It is generally best to have the rear picture as close as possible to the front picture and for that reason I prefer to have the front picture on one side of the translucent sheet and the rear picture on the rear side thereof, although if desired, a separate sheet may be used for each picture, thus permitting of some variations in the combined composite picture.

Figure 7:
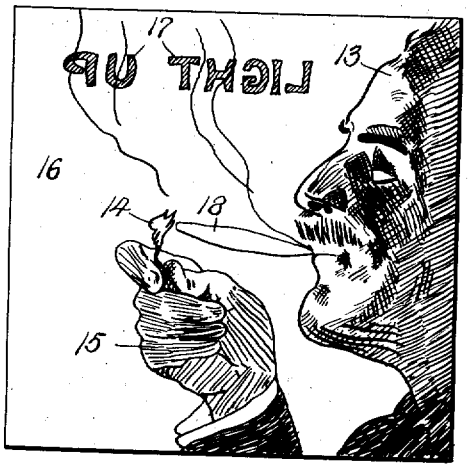
Figures 6, 7 and 8 show pictures used in advertising a cigar, Figure 6 showing the picture appearing on the front of the screen, Figure 7 showing the picture appearing on the rear of the screen, and Figure 8 showing the combination of the two.
Figure 6:
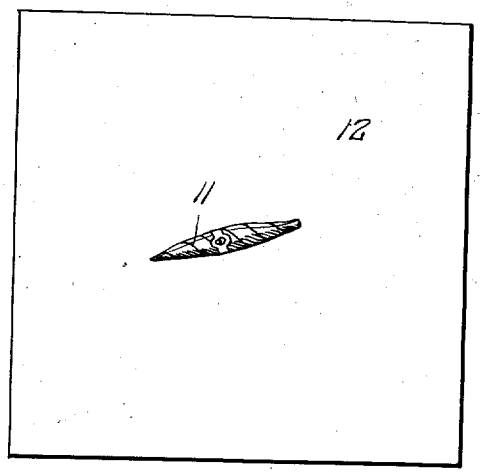
Figure 8:
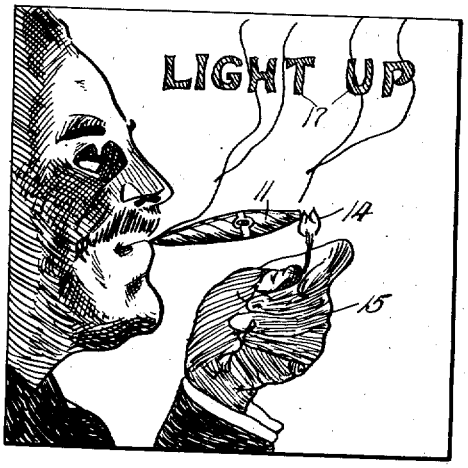

In the modification illustrated in Figures 6, 7 and 8, a cigar 11 appears upon the front picture and this may be surrounded by a white or other background 12. The rear picture may comprise the representation of a man 13 holding a lighted match 14 in his hand 15, and the background 16 may be suitably colored as desired. Suitable wording 17 may appear upon the rear picture and this may be done either by the addition of suitable letters, or by the omission of the background, if a colored background is made use of. The rear picture is directly behind the front picture and there may be an omission 18, if desired, on the rear picture to correspond with the cigar on the front picture, so that when the lights are flashed on, the combined picture as shown on Figure 8 will be visible. Here again, should it be found desirable, the front picture may be located at the rear and vice versa, so that the picture illustrated in Figure 6 will be the rear picture, while that illustrated in Figure 7 will be the front picture. All or a part of the rear picture may be made opaque, as shown for example at 19 on Figure 4, so that it will appear as a shadow on the combined picture when the illumination comes from the rear as a shadow.

The modifications described above are given merely by way of example and the invention is not to be considered as limited thereto, a number of variations being possible within the scope of my invention.

What I claim is:

1. A changeable advertising sign consisting of a casing of opaque material and having an open side, lights within said casing, a translucent sheet closing said open side, a representation which is complete in itself but which does not include a representation of the article to be advertised at one side of said sheet and a representation which includes a representation of the article to be advertised and which is supplementary to the first mentioned representation at the other side of said sheet, only one representation being visible from the front when the lights are out and the combination of both representations being visible from the front when the lights are on, the combined representations when viewed together from the front when the lights are on forming a complete clean-cut picture registering as to all its parts whereby the periodic operation of the lights causes two clean-cut pictures to be seen in alternation from the front of the sign, one of said pictures being the representation of something which lacks a feature, said feature which is lacking in the one picture appearing in the other picture, one of which pictures comprises a representation of a thing and the other of which does not comprise the representation of said thing, thereby showing alternately the representation of a thing in operative relation to some other thing and then the representation of one of the things without the other thing.

2. A changeable advertising sign consisting of a casing of opaque material and having an open side, lights within said casing, a translucent sheet closing said open side, a representation which is complete in itself but which does not include a representation of the article to be advertised at one side of said sheet and a representation which includes a representation of the article to be advertised and which is supplementary to the first mentioned representation at the other side of said sheet, only one representation being visible from the front when the lights are out and the combination of both representations being visible from the front when the lights are on, one of said representations at the part corresponding to the article to be advertised overlapping and being at least as dark as a portion of the other representation so that when both representations are viewed together from the front when the lights are on, the overlapping part of one representation seems to disappear and is blended and merged in the overlapping part of the other representation, the combined representations when viewed together from the front when the lights are on forming a complete clean-cut picture registering as to all its parts whereby the periodic operation of the lights causes two clean-cut pictures to be seen in alternation from the front of the sign, one of said pictures being the representation of something which lacks a feature, said feature which is lacking in the one picture appearing in the other picture, one of which pictures comprises a representation of a thing and the other of which does not comprise the representation of said thing, thereby showing alternately the representation of a thing in operative relation to some other thing and then the representation of one of the things without the other thing.

3. A changeable advertising sign consisting of a casing of opaque material and having an open side, lights within said casing, a translucent sheet closing said open side, said translucent sheet having a representation which is complete in itself but which does not include a representation of the article to be advertised on the front side thereof, and a representation which includes a representation of the article to be advertised and which is supplementary to the first mentioned representation immediately behind said sheet, only the first mentioned representation being visible from the front when the lights are out and the combination of both representations being visible from the front when the lights are on, the combined representations when viewed together from the front when the lights are on forming a complete clean cut picture registering as to all its parts, whereby the periodic operation of the lights cause two clean cut pictures to be seen in alternation from the front of the sign, one of said pictures being the representation of something which lacks the article to be advertised and the other of said pictures being the representation of said thing supplied with the article to be advertised in operative relation thereto.

4. A changeable advertising sign consisting of a casing of opaque material and having an open side, lights within said casing, a translucent sheet closing said open side, said translucent sheet having a representation which is complete in itself but which does not include a representation of the article to be advertised on the front side thereof, and a representation which includes a representation of the article to be advertised and which is supplementary to the first mentioned representation immediately behind said sheet, only the first mentioned representation being visible from the front when the lights are out and the combination of both representations being visible from the front when the lights are on, the rear representation at the part representing the article to be advertised overlapping and being at least as dark as a portion of the front representation, so that when both representations are viewed together from the front when the lights are on the overlapping part of the front representation seems to disappear and is blended and merged in the overlapping part of the rear representation, the combined representations when viewed together from the front when the lights are on forming a complete clean cut picture registering, as to all its parts, whereby the periodic operation of the lights cause two clean cut pictures to be seen in alternation from the front of the sign, one of said pictures being the representation of something which lacks the article to be advertised and the other of said pictures being the representation of said thing supplied with the article to be advertised in operative relation thereto.

THEODORE KELLER.